United States Patent
Suttie (12)

(10) Patent No.: US 9,145,257 B2
(45) Date of Patent: Sep. 29, 2015

(54) BELT SUPPORTING

(75) Inventor: Robert Suttie, Fife (GB)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 13/330,118

(22) Filed: Dec. 19, 2011

(65) Prior Publication Data

US 2013/0153371 A1    Jun. 20, 2013

(51) Int. Cl.
| | |
|---|---|
| B65G 39/16 | (2006.01) |
| B65G 15/60 | (2006.01) |
| G07F 19/00 | (2006.01) |
| G07D 11/00 | (2006.01) |

(52) U.S. Cl.
CPC ............ *B65G 15/60* (2013.01); *G07D 11/0018* (2013.01); *G07F 19/202* (2013.01); *G07F 19/205* (2013.01); *B65G 39/16* (2013.01)

(58) Field of Classification Search
USPC ............... 198/808, 818, 835, 842; 193/37
See application file for complete search history.

(56) References Cited

U.S. PATENT DOCUMENTS

| | | | | |
|---|---|---|---|---|
| 3,627,108 | A | * | 12/1971 | Hansen .......................... 198/600 |
| 5,905,810 | A | * | 5/1999 | Jones et al. .................... 382/135 |
| 6,029,800 | A | * | 2/2000 | Kratz et al. .................... 198/835 |
| 7,413,189 | B2 | * | 8/2008 | Graef et al. .................... 271/272 |
| 2009/0078365 | A1 | * | 3/2009 | Suehara et al. ................ 156/249 |
| 2010/0035741 | A1 | * | 2/2010 | Harris et al. ................... 493/397 |

OTHER PUBLICATIONS

Friction Forces in O-ring Sealing, American Journal of Applied Sciences 2 (3): 626-632, 2005, Al-Ghathian, et al., Univeristy of Jordan.*
Friction Forces inO-Ring Sealing, American Journal of Applied Sciences 2 (3); 625-632, 2005, Al-Ghathian, et al. University of Jordan.*
Parker O-Ring Handbook, Parker Hannifin Corporation, 2007.*
Friction Forces in O-ring Sealing, American Journal of Applied Sciences 2 (3): 626-632, 2005, AkGhathian, et al., University of Jordan.*

* cited by examiner

*Primary Examiner* — Gene Crawford
*Assistant Examiner* — Lester Rushin
(74) *Attorney, Agent, or Firm* — Joseph P. Mehrle

(57) ABSTRACT

An apparatus and method are disclosed for supporting a flat belt member. The apparatus includes a drum member rotatable about a longitudinal axis of rotation and comprising an outer support surface that generally increases in diameter from a first end region to a central region and decreases in diameter from the central region to a further end region. The central region includes a groove in the support surface which extends circumferentially around the drum member. A ring member is located in the groove.

17 Claims, 10 Drawing Sheets

BELT SUPPORTING

FIELD OF THE INVENTION

The present invention relates to a method and apparatus for supporting a flat belt. In particular, but not exclusively, the present invention relates to a drum-like roller that co-operates with a drive ring to help avoid a flat belt riding on the roller being pushed off a drive surface and which also avoids slip between the drum and the belt.

BACKGROUND TO THE INVENTION

Media depositories are used to receive media items from a customer. One common type of media depository is a sheet media depository for receiving items of media in sheet form. For example, such items of media can be currency notes, cheques, tickets, giros, receipts or the like.

Sheet media depositories are used in automated teller machines (ATMs) and other self-service terminals. Other such self-service terminals are vending machines, change machines, teller units, cash recyclers or the like. The sheet media depositories are used to identify, validate and store or return deposited sheets.

Some sheet depositories are capable of receiving a bunch of sheets in a loading area and then picking individual sheets from the bunch so that each sheet can then be identified and validated individually prior to storage of the validated sheet within a depository or returned to a customer. These depositories are sometimes referred to as bunch sheet depositories. Bunch sheet depositories may transport the bunch from a loading area to a picking area or the picking area may be adjacent to the loading area.

Bunches of items of media such as currency notes and/or cheques are thus deposited by a user and, subsequent to a user agreement step and item verification step, these items are stored semi-permanently within a self-service terminal until security staff or bank staff come to empty the storage unit. The storage unit is sometimes referred to as a stacking bin. Alternatively, when an input item is identified as being an illicit or damaged item, the item is stored in a storage unit referred to as a reject bin.

In prior known ATMs, teller assist units and other self-service terminals or the like which may or may not include a depository, items such as cheques or currency notes are thus driven through a sheet transport system using pairs of rollers and/or belts that pinch the items and rotate to drive items along a pre-determined pathway. Often, at a final pair of rollers, the items are pushed into a stack of items being stored or dispensed. Because of the flexible nature of the items, it is difficult to ensure that transported items of media reach a desired destination.

Another problem which is well observed in prior art systems is observed when a crown roller and flat belt system are utilised to drive items of media along a transport path. Such systems have traditionally experienced a long history of issues relating to the belt moving a reduced distance relative to that applied by a crown roller. This is due to slippage between the crown roller material and a flat belt. It is also known that such systems are susceptible to belts being pushed offset to a crown profile by operator action which can result in the belt falling off the crown surface. Roller and flat belt systems are also prone to the belt accidentally becoming offset without any operator intervention.

SUMMARY OF THE INVENTION

It is an aim of the present invention to at least partly mitigate the above-mentioned problems.

It is an aim of certain embodiments of the present invention to provide a method and apparatus which helps locate a flat drive belt on a drive surface of a rolling drum member.

It is an aim of certain embodiments of the present invention to provide a method and apparatus which helps avoid slippage at the interface between an outer surface of a drive drum and a surface of a drive belt driven by the drum.

It is an aim of certain embodiments of the present invention to provide a self-centring roller and flat belt system which can recover into an operating state even subsequent to severe agitation by an operator accidentally interfering with the system when carrying out a jam clearance operation.

According to a first aspect of the present invention there is provided apparatus for supporting a flat belt member, comprising:
   a drum member rotatable about a longitudinal axis of rotation and comprising an outer support surface that generally increases in diameter from a first end region to a central region and decreases in diameter from the central region to a further end region, said central region comprising a groove in the support surface extending circumferentially around the drum member; and
   a ring member located in the groove.

Aptly, the ring member is manufactured from a material that has a co-efficient of friction of at least about around 0.70.

Aptly, the co-efficient of friction is at least about around 0.90.

Aptly, the co-efficient of friction is at least about around 1.00.

Aptly, the ring member is a rubber "O" ring.

Aptly, the drum member is a crown roller.

Aptly, the ring member arranged to substantially prevent slippage between the drum member and an inner abutting surface of a flat belt member.

Aptly, the groove has a substantially U-shaped cross-section or a substantially V-shaped cross-section or a substantially semi-circular cross-section.

Aptly, the ring member has a substantially circular cross-section or a substantially rectangular cross-section.

According to a second aspect of the present invention there is provided apparatus for conveying an item of media, comprising:
   a drum member rotatable about a longitudinal axis of rotation and comprising an outer support surface that generally increases in diameter from a first end region to a central region and decreases in diameter from the central region to a further end region, said central region comprising a groove in the support surface and a ring member in the groove; and
   a flat endless belt member that at least partially rides on the central region of the support surface.

According to a third aspect of the present invention there is provided an automated teller machine (ATM) or self-service terminal that comprises a drum member rotatable about a longitudinal axis of rotation and comprising an outer support surface that generally increases in diameter from a first end region to a central region and decreases in diameter from the central region to a further end region, said central region comprising a groove in the support surface extending circumferentially around the drum member; and
   a ring member located in the groove.

According to a fourth aspect of the present invention there is provided a method of preventing slippage between a rotatable drum member and a flat belt member, comprising the steps of:
   providing a groove in an outer surface of a rotatable drum member; and providing a ring member in the groove whereby as the drum member rotates the ring member provides a non-slip surface between a flat belt member that at least partially rides on the outer surface and the ring member, and the ring member and the drum member.

According to a fifth aspect of the present invention there is provided a method of centring a flat belt member on a rotating drum member, comprising the steps of:

providing a groove in a central region of an outer surface of a rotatable drum member;

providing a ring member extending proud of the outer surface of the rotatable drum element in the groove; and locating the belt member at the central region of the drum member as the belt member rides on the ring member.

Aptly, the method further includes the step of providing the groove in a crowned outer surface of the drum member.

According to a sixth aspect of the present invention there is provided a method of driving an endless belt member, comprising the steps of:

simultaneously and automatically centring a rotating belt member on a drive roller member and providing a non-slip interface between the belt member and roller member.

Certain embodiments of the present invention provide the advantage that a flat belt and drive drum can be provided which is self-centring so that the flat belt is constantly kept on, or quickly recovers to, a desired drive location on the drive drum.

Certain embodiments of the present invention provide the advantage that slippage between a drive drum and a flat belt is wholly or at least substantially avoided.

Certain embodiments of the present invention provide a mechanically non-complex and elegant solution to a traditional problem.

Certain embodiments of the present invention provide an improved consistency of media transportation due to reduced slippage and/or skewing of items of media.

Certain embodiments of the present invention provide a reduce reject rate due to more consistent transport performance.

BRIEF DESCRIPTION OF DRAWINGS

Embodiments of the present invention will now be described hereinafter, by way of example only, with reference to the accompanying drawings in which.

DESCRIPTION OF EMBODIMENTS

Figure 1:
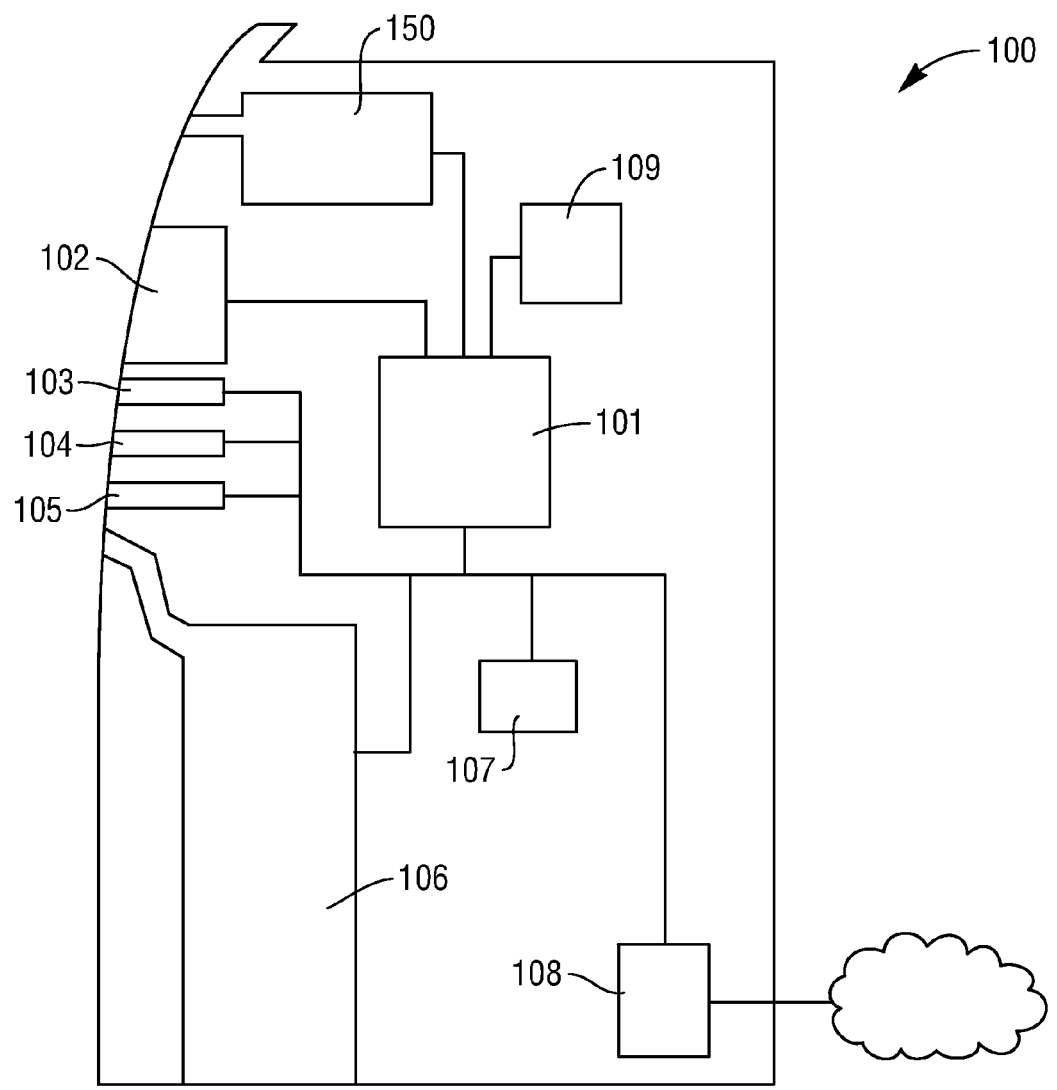
FIG. 1 is a schematic diagram of an ATM according to an embodiment of the present invention.

In the drawings like reference numerals refer to like parts.

FIG. 1 illustrates a block diagram of a self-service terminal 100 in the form of an automated teller machine (ATM) according to one embodiment of the present invention. It will be understood that certain embodiments of the present invention are applicable to other types of terminal such as ATMs, cash recyclers, teller assist units, vending machines, self-service terminals, change machines and the like.

The ATM 100 includes different modules for enabling transactions to be executed and recorded by the ATM 100. These ATM modules include customer transaction modules and service personnel modules. The ATM modules include an ATM controller 101, a customer display 102, a card reader/writer module 103, an encrypting keypad module 104, a receipt printer module 105, a cash dispenser module 106, a journal printer module 107 for creating a record of every transaction executed by the ATM, a connection module 108, an operator panel module 109 for use by a service operator (such as a field engineer, a replenisher (of currency, of printed paper or the like), or the like).

Certain customer transaction modules (such as the ATM controller 101) are also used by the service personnel for implementing management functions. However, some of the modules are referred to herein as service personnel modules (such as the journal printer module 107 and the operator panel module 109) because they are never used by ATM customers.

FIG. 1 also illustrates a schematic diagram of a deposit module 150 according to one embodiment of the present invention. The deposit module 150 is operable to receive bunches of items of media such as currency notes, bank notes and/or cheques from a customer. These can be stored securely or returned to a customer.

Figure 2:
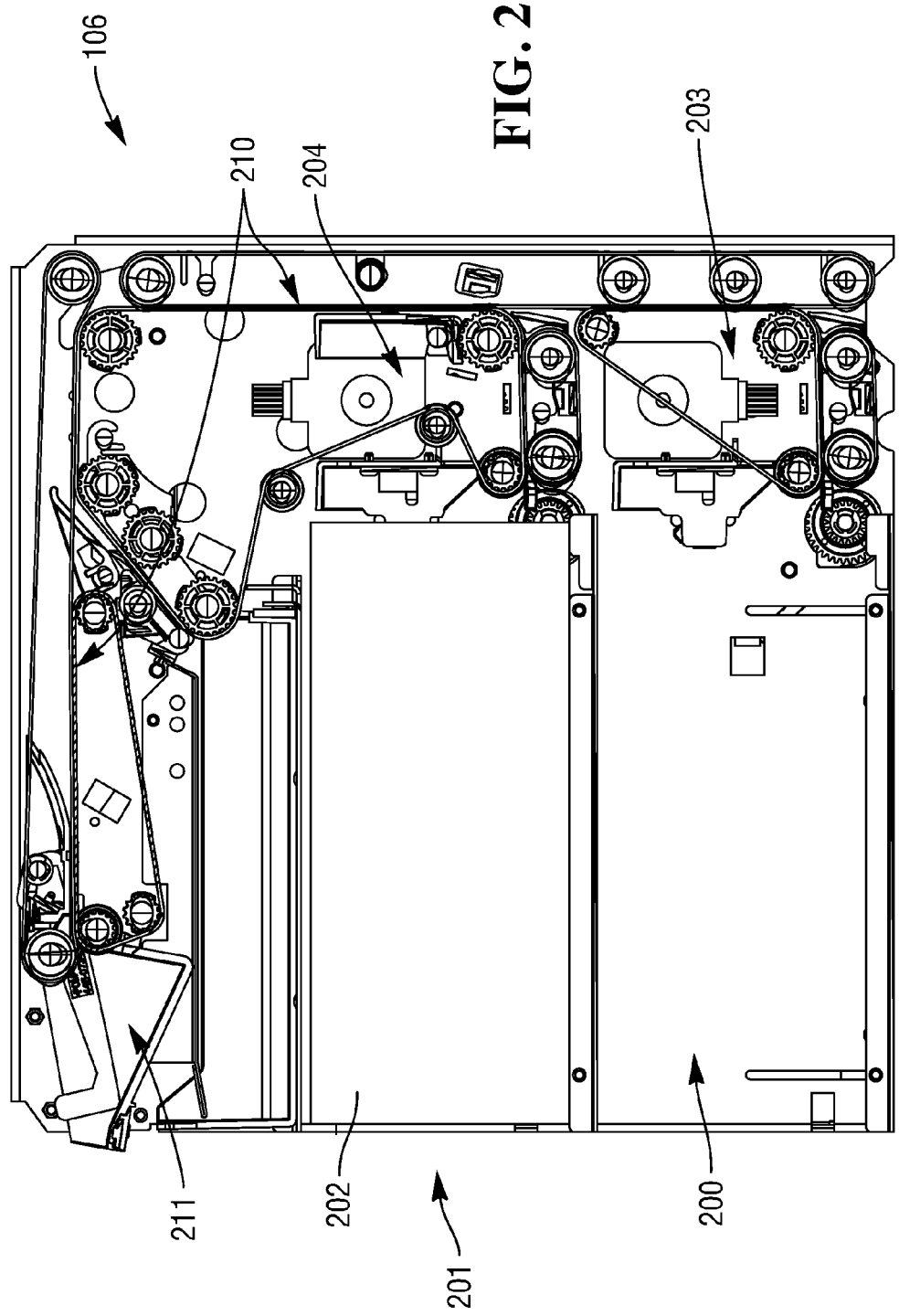
FIG. 2 is a schematic diagram of a dispensing module according to an embodiment of the present invention.

The dispenser module 106 is shown in more detail in FIG. 2 and illustrates how items of media such as currency notes or the like may be loaded into cassettes, stored in pick module regions and thereafter picked one-by-one for subsequent provision at a stacker point. In more detail, the dispenser module 106 shown in FIG. 2 includes two pick modules 200, 201. These are cavities within a surrounding chassis into which a cassette containing many stacked currency notes may be located. The pick module 201 shown in FIG. 2 is illustrated with a currency cassette 202 fitted therein. It will be appreciated that certain embodiments of the present invention are not restricted to the use of dispensing modules having two pick modules. Rather, one, two, three, four or more pick modules may be provided within a dispenser module.

Each pick module is associated with a respective pick transport 203, 204, whereby items of media picked from a cassette in a particular pick module are thereafter fed into an adjacent pick transport. Thereafter, items of media are transported one-by-one into a presenter transport region 210. Within the pick module and presenter transport items of media are subject to sensing techniques which detect media length and singularity. If an item of media is regarded as being acceptable, that is to say, sensor signals are within predetermined threshold limits, the item continues through the presenter transport 210 until it is stacked at a stacker area 211. If the media is regarded as being unacceptable, transport of the item will continue only a part way through a transport pathway but is diverted and thereafter stored in a divert transport region and a further item of media will be picked and stacked to replace the diverted one.

Figure 3:
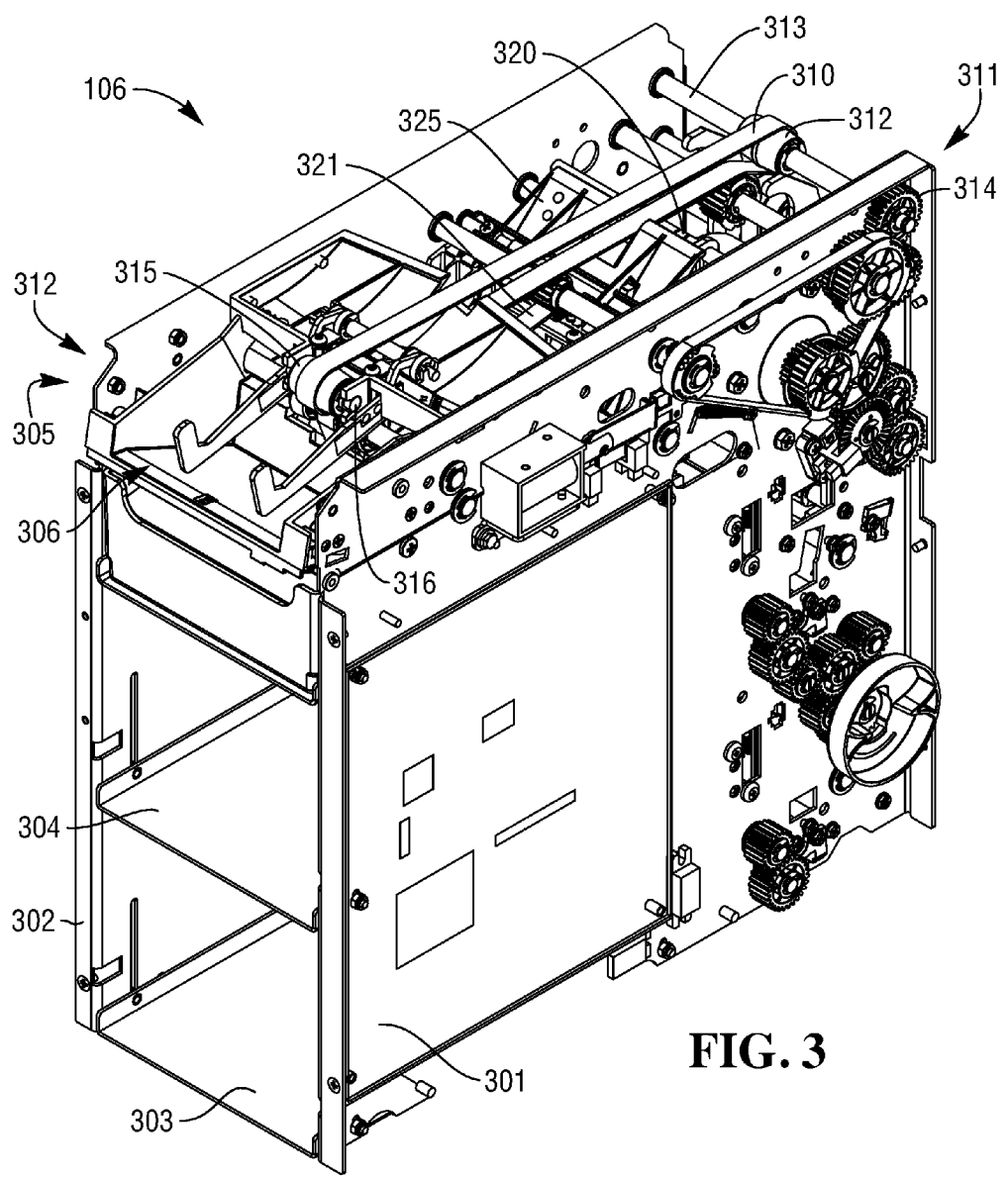
FIG. 3 illustrates another view of a currency note dispensing module in the ATM.

FIG. 3 illustrates another view of the currency note dispensing module 106 of an ATM. It will be appreciated that certain embodiments of the present invention are not restricted to use of a dispensing module or indeed use in an ATM. Rather, certain embodiments of the present invention are broadly applicable to circumstances where an item of media such as a flexible sheet-like item of media such as a voucher or currency note or receipt or the like is to be transported from one location to another.

The dispensing module 106 shown in FIG. 3 has a first side wall 301 which is spaced apart from and substantially parallel with a further side wall 302. The space between the side walls provides a cavity for two currency cassettes (not shown) which are each located on a respective shelf. A first shelf 303 forms a base of the module 300 whilst a further shelf 304 extends between the front and back walls about half way up. The shelves bridge the gap between the side walls. As illustrated in FIG. 3, there are multiple belts and associated spur gears which are driven and interlinked to transfer items of media from the currency cassettes generally upwards in the module to the upper region 305 which provides a transport pathway region leading to an exit orifice 306 where items of media are dispensed. It will be understood that a gear is a rotating machine part having teeth or cogs which mesh with other co-operating parts. Two gears or more working together provide a transmission. It will be appreciated that certain embodiments of the present invention can provide drive through other mechanisms. A belt is a loop of flexible material which provides a connection between rotating parts. For example, between rotating shafts or between a rotating shaft and a wheel or pulley. Belts are used as a source of motion to transmit power.

As illustrated in FIG. 3, a main drive belt 310 extends from a back region 311 of the dispensing module towards a front region 312. One end of the major belt 310 is linked over a drive drum 312 which is driven by a respective drive shaft 313 which is itself driven by rotation of a drive gear 314. Thus, as the drive gear 314 is rotated, the shaft 313 rotates causing the drum 312 mounted thereon to rotate. The rotation of the outer abutment surface of the drum 312 causes the drive belt 310 to be driven. Another end of the belt 310 is provided by a further drum 315 which is mounted towards the front 312 of the dispensing module. The drum 315 has a shaft 316 which extends there through longitudinally and ends of the shaft are each supported in a respective slot of a drum support 317.

The major drive belt 310 is opposed with and co-operates with a first co-operating drive belt 320 and a further co-operating drive belt 321. These are illustrated more clearly in FIGS. 7 and 8.

In use, items of media such as currency notes or the like are located one-by-one onto a transport path with an ultimate desired destination being the exit orifice 306. The items of media are held between opposed parts of the belt and as these belts rotate, items of media are moved along the transport path therebetween. As illustrated in FIG. 3, a purge plate 325 can be pivoted about a respective pivot point 326 to flip up and direct items of media being carried between the major belt 310 and the first co-operating belt 320 into a purge bin 330. With the purge plate in a non-operational state, items of media are carried in a substantially linear pathway towards the exit orifice. Items are purged if they are defective or if more than one item is detected or if a user cancels a transaction.

Figure 4:
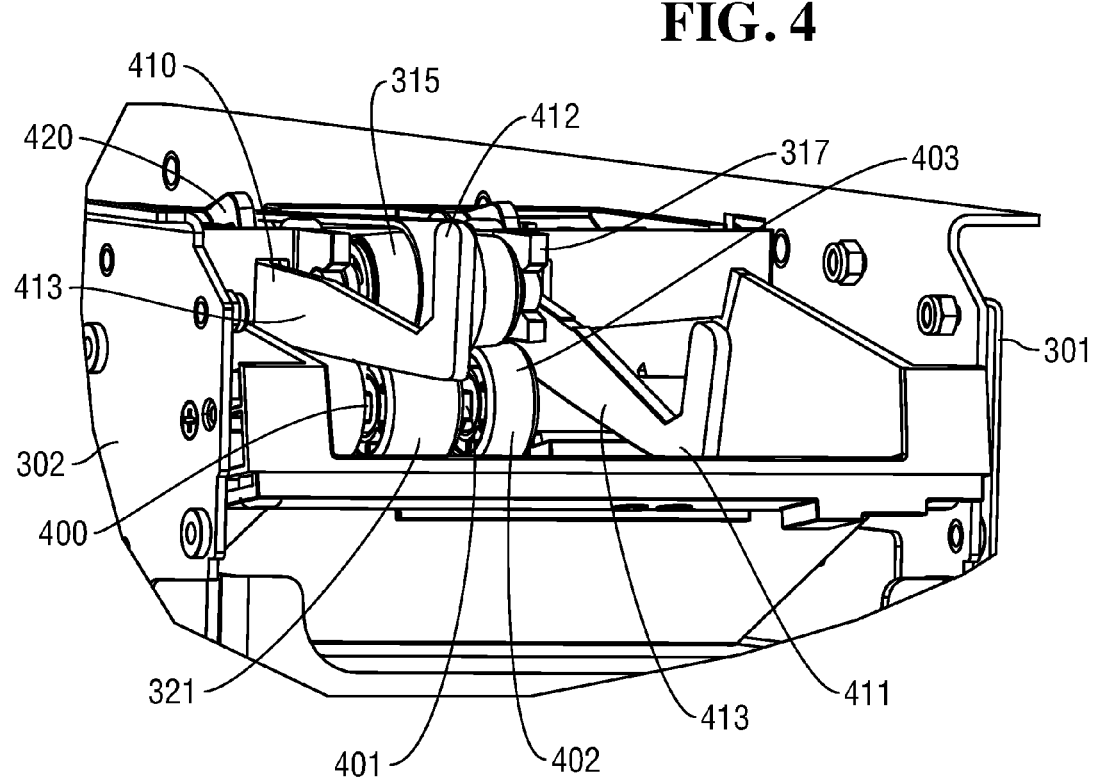
FIG. 4 illustrates a magnified view of a dispensing orifice.

FIG. 4 illustrates parts of the dispensing module in the region of the exit orifice in more detail. As illustrated in FIG. 4, the drum 315 which supports an end of the major belt 310 is substantially convex in shape. That is to say, the drum is like a crowned roller. The drum thus has a diameter which extends from a first end towards a central region and then reduces from that central region towards a further end. A shaft 316 which extends from each end of the drum can be seen in FIG. 4 located in the slot of the support 317.

As illustrated in FIG. 4, the major drive belt 310 loops over the central region of the drum 315. Likewise, the further co-operating belt 321 is driven on a supporting gear 400 which rotates with a drive shaft 401. The drive shaft 401 also carries a pair of rollers 402. Each roller 402 has a truncated cone shape which presents an outer running surface 403 which is diametrically smaller towards a central region where the co-operating belt 321 is located than at an outer end towards the first wall 301 or opposed wall of the dispensing module.

FIG. 4 also helps illustrate the location of a first guide arm 410 and a further guide arm 411. Each guide arm 410, 411 has a first dog leg end which is substantially L-shaped. Thus, an upwardly extending leg 412 extends substantially perpendicular to a longitudinal arm 413. A further end of each guide arm includes a hook 420 which hooks over a guide shaft to enable the guide arms to rotate. In FIG. 4 the left hand side guide arm 413 shown closest to the left hand side wall is in an upper position whilst the right hand side guide arm 413 closest to the first side wall 301 is shown in a lower state. In use, the guide arms are used to guide items of media as they are borne along the transport path and emerge at a region between the co-operating belts. As the items emerge, they are curved from a substantially planar state in which they are transported between the belts into an arcuate cross-section which then enables the items of media to be driven out of the dispensing unit towards a storage zone at the exit orifice.

Figure 5:
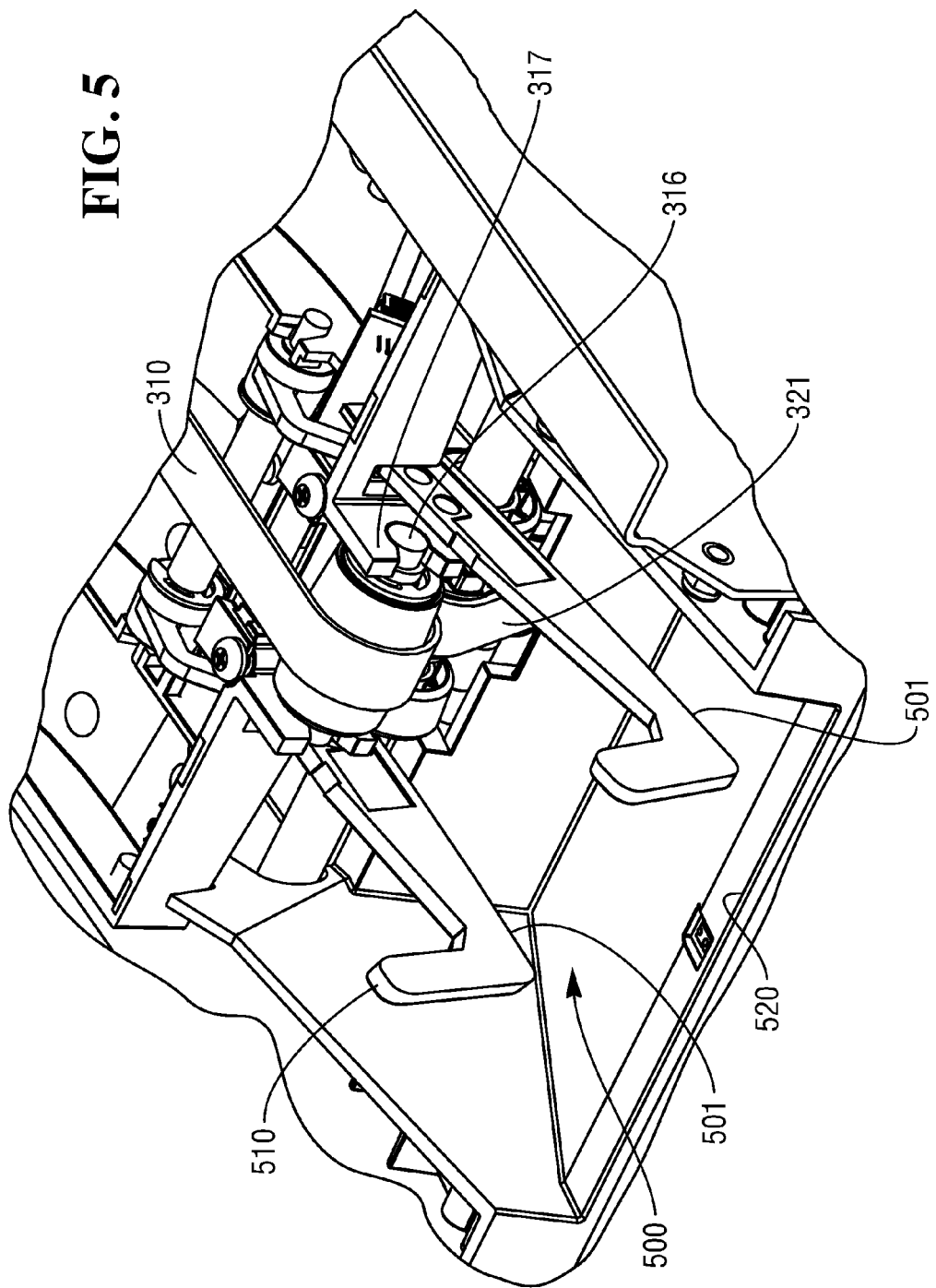
FIG. 5 illustrates another view of the parts shown in FIG. 4.

FIG. 5 helps illustrate the storage zone 500 in more detail and also helps illustrate how the upper major belt 310 co-operates with the further co-operating belt 321. As will be understood, the items of media thus emerge at a position between the belts. The items of media such as currency notes have a longitudinal length and also a cross-section in their body which defines a plane of transport. The items are thus transferred in a common plane of transport and emerge between the belts. Because the rotating rollers are located slightly offset with respect to the plane of transport, the items of media are curved as they pass between the rollers. A leading edge of an item of media will thus begin to curve as it emerges and this will continue. Because of the curved state this imbues rigidity into the currency note which then enables it to be thrust outwards into the exit zone 500 where items of media are stacked one-by-one. The position of the guides is mechanically timed so that as a leading edge of an item of media emerges, a lower abutment surface 501 of each guide will engage with side regions of an item of media. As the item of media is thus thrust rigidly out between the co-operating belts, the item lifts the guide arms. This helps break movement of the items and helps control the items. As the item of media continues to be thrust along the transport path, the guide arms are lifted higher and higher. As previously mentioned, the guide arm to the left hand side of FIG. 5 is shown in an upper position which is representative of a position of a guide arm when almost a whole item of media has been thrust out between the belts. At this moment in time, further upward motion of the guide arm is prevented because an upper tip 510 of the guide arm will abut with a ceiling wall (not shown) on the dispensing unit. The guide arm shown towards the right hand side of FIG. 5 is illustrated in a downward position characteristic of the position of the guide arm before an item of media emerges or just as the item of media begins to abut with the lower abutment surface 501 of the side arm and begin a lifting process. In practice, both arms will tend to move in common so that the arms appear at around the same height moving upwards or downwards.

As a trailing edge of the item of media is ejected between the co-operating belts, there is no longer any rigid structure lifting the guide arms. At this point the guide arms will both simultaneously drop which helps locate the items of media onto a support surface 520 where items of media can accumulate in a stack. Leading edges of the stacked items of media are presented at the exit orifice 306 for picking by a user.

Figure 6:
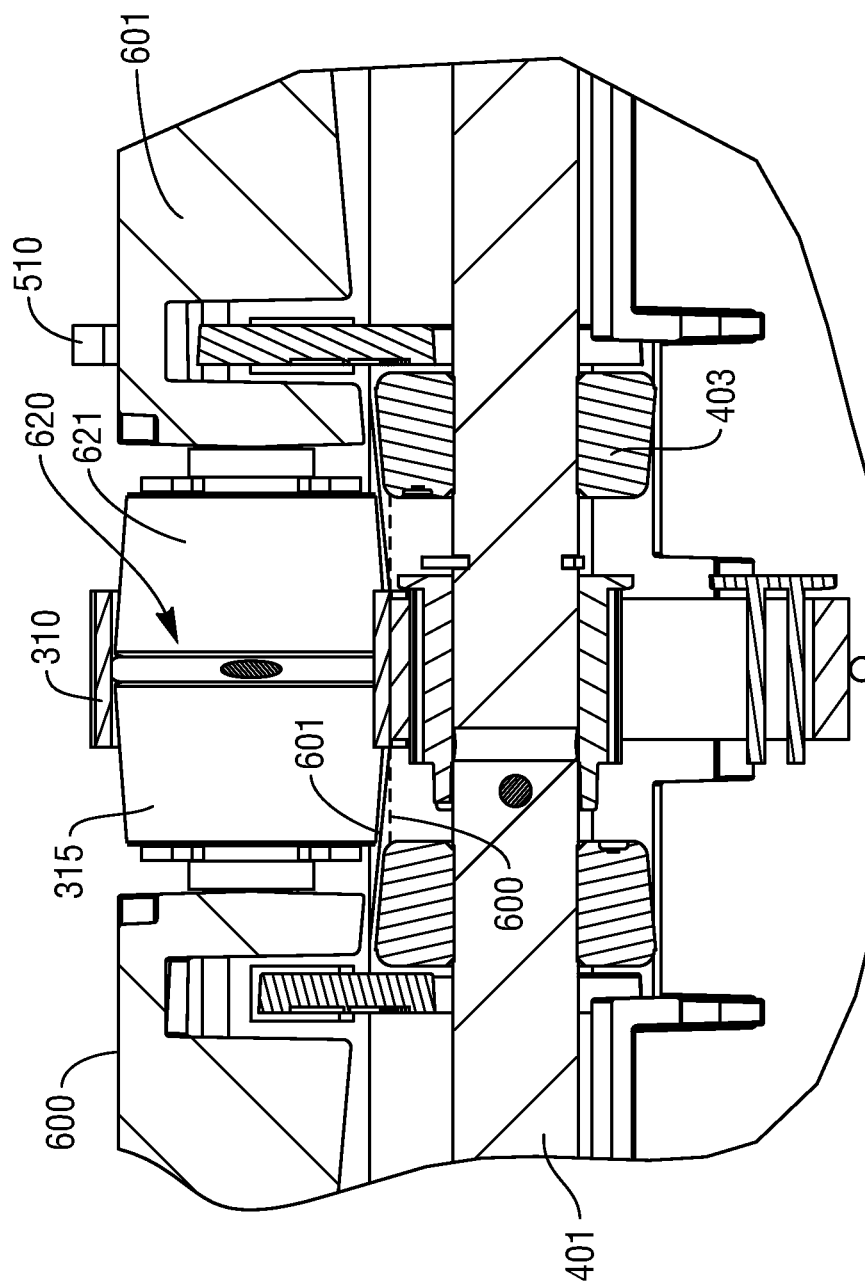
FIG. 6 illustrates an item of media being bent out of a pre-determined plane of transport.

FIG. 6 illustrates the positioning of the roller 315 which supports the drive belt 310 in more detail. FIG. 6 also helps illustrate how the shaft 401 carries two rollers 403 which deform an item of currency from a substantially planar plane of transport shown by dashed line 600 into a curved state. FIG. 6 illustrates an item of media such as a currency note or the like 601 in which an arcuate cross-section has been imbued. It will be appreciated that by imbuing an arcuate cross-section into a sheet-like item of media, the rigidity of the item is increased. By increasing the rigidity in this way, transportation of the item of media is made easier.

As illustrated in FIG. 6, each roller 403 has a truncated cone-like outer surface which has a greater diameter at ends towards the side walls of the dispensing module. The outer abutment surface of the rollers extends above the plane of transport in which an item of media is ejected between the opposing rollers. In this way, the leading edge of the item of media abuts with the outer surface of the rollers and is deformed upwardly.

It will be appreciated that FIG. 6 illustrates a view of the rollers 403 looking towards the exit orifice. Thus, a back portion of the guides is shown with the tip 510 of the left hand side guide shown in FIG. 5 just visible and extending above an upper surface 600 of a crossbar 601. As the item of media is thus urged into the page shown in FIG. 6 towards the exit orifice, a curved cross-section is imparted. It will be appreciated that whilst certain embodiments of the present invention have been described in which the edge regions of an item of media are lifted above a plane of transport, certain other embodiments of the present invention could provide a down-turned curve in the item of media. The two rollers 403 thus act as profile forming members and the outer surface of the rollers which is a truncated cone-type shape act as an abutment surface.

FIG. 6 also helps illustrate how the flat belt 310 rides on a central region 620 of the rotating drum 315. The outer drive surface 621 of the drum 315 has a groove formed in it in which an "O" ring is located. This is illustrated more clearly in FIGS. 9 to 11. By having a flat belt 310 ride on a crowned surface, the belt is continually centred so that the belt does not slide off the drive surface. Also, by having a high friction ring in a groove in the outer surface the crowned profile of the drum is enhanced and also slippage between the flat belt and the drive drum is entirely avoided or at least substantially mitigated.

Figure 7:
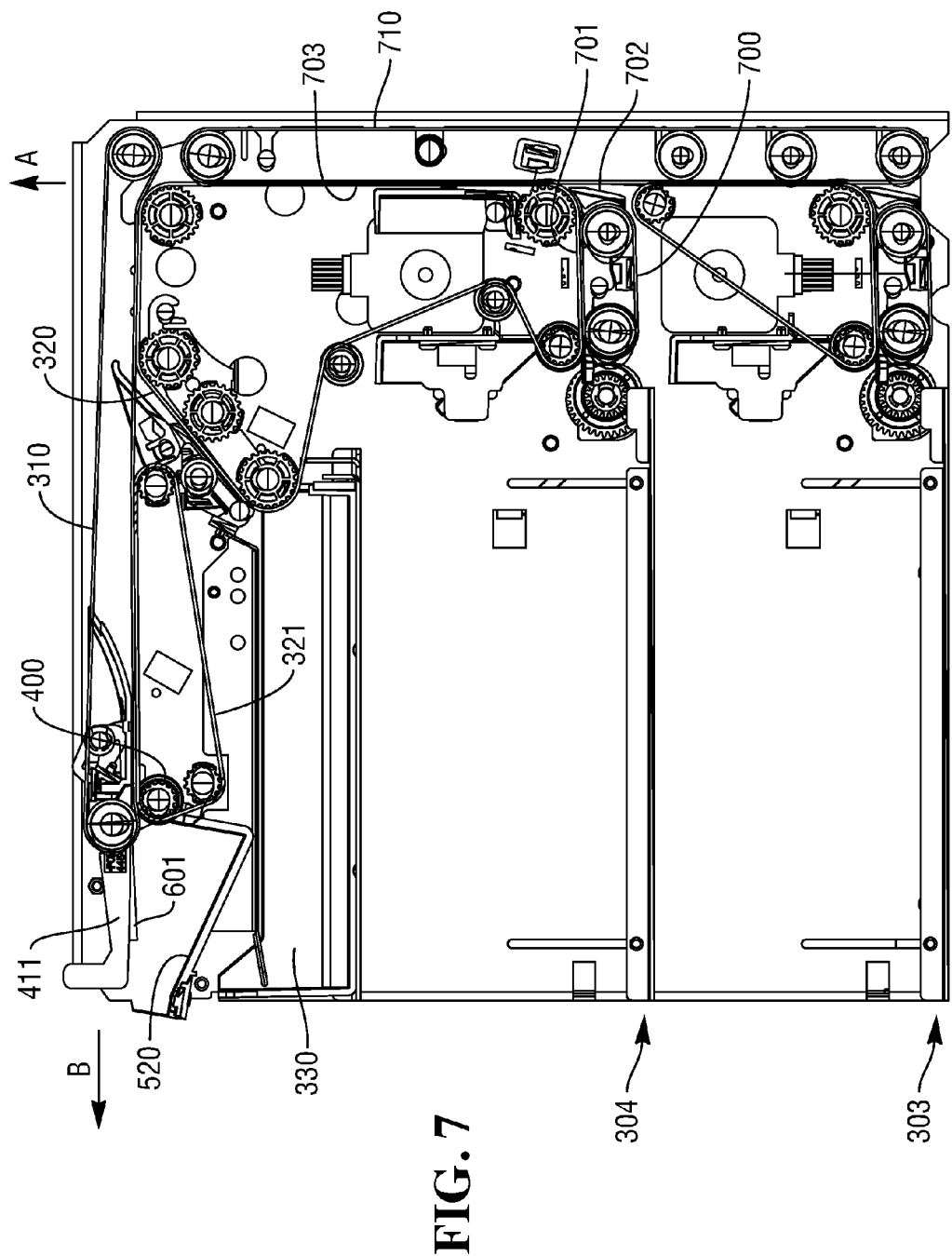
FIG. 7 illustrates a side view of the dispensing module with guide bars in an upper position.

FIG. 7 is a side view of the module shown in FIG. 3 and illustrates how the empty compartments formed above the base plate shelf 303 and mid-floor shelf 304 provide spaces into which currency cassettes may be located. As will be understood by those skilled in the art, as a currency cassette is slotted into a respective cavity, parts interlock with the various belts and gears of the module so that items of media can be removed from the currency cassette one-by-one and carried along a pre-determined transport pathway between opposed co-operating belts. For example, if a currency cassette (not shown) were located on the mid-floor 304 an item of media could be extracted and would be moved from left to right between a lower rotating belt 700 and a portion 701 of the first co-operating belt 320. An item of media would thus be moved from left to right until it reached a guide 702 which curves the item upwardly where it is transported between a further region 703 of the first co-operating belt 320 and a third co-operating belt 710. An item of media thus moves vertically upwardly in the direction shown by arrow A in FIG. 7 and then is turned around a corner and begins to move towards the left hand side shown in FIG. 7 along a transport direction shown by Arrow B. FIG. 7 illustrates how an emerging item of media 601 causes a guide arm 411 and a further spaced apart guide arm (not shown) to lift.

Figure 8:
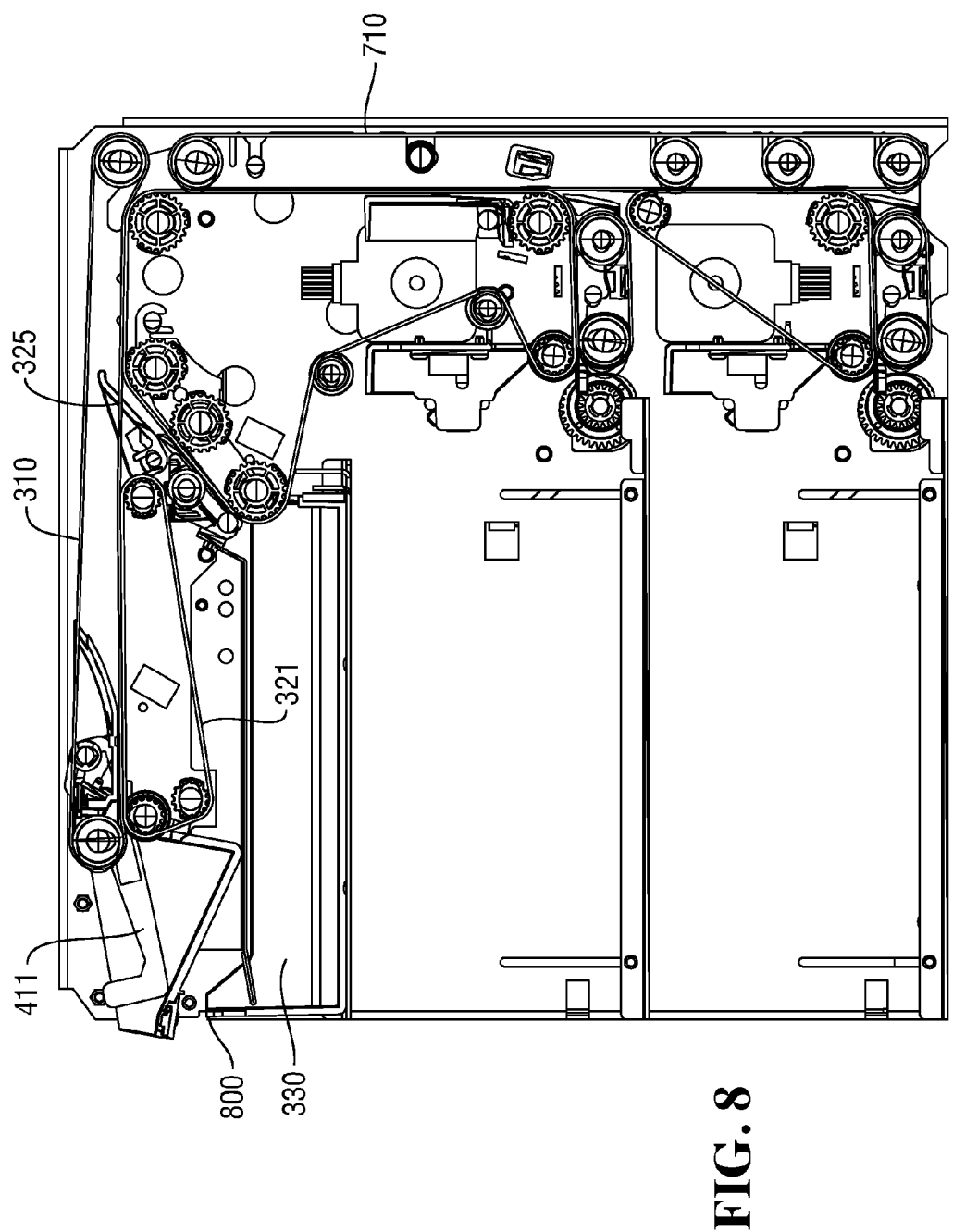
FIG. 8 illustrates a side view of the dispensing module shown in FIG. 7 but with guide bars in a lower position.

FIG. 8 illustrates a similar view to that shown in FIG. 7 except in FIG. 8 the guide arms 411 have dropped downwardly because an item of media 601 has been fully discharged from between the major belt 310 and the further co-operating belt 321. The item of media which is imbued with rigidity by being curved in cross-section no longer thus urges or lifts a guide arm upwards. The guide arm thus eventually because of its mass and gravity falls downwards which helps break the ejection of the item of media and locates the item of media 601 in an accumulating stack 800. Thus, each guide arm is mounted so that as a trailing edge of an item of media leaves the first and further transport elements provided by the major belt 310 and further co-operating belt 321, the guide arms drop in a direction towards the plane of transport and locate an item of media in a stacking position. Thus, a method is provided in which currency notes can be located at a desired location such as a stacking position in which the items of media are transported along a transport path which has a pre-determined plane of transport and then, as the item is transported, lateral edges of the currency note or a central region of the currency note are located to one side of the plane of transport. This provides an arcuate cross-section in a region such as a leading region or the whole region or a rear region of the item which increases rigidity and allows the item to be duly directed into a desired position.

Figure 9:
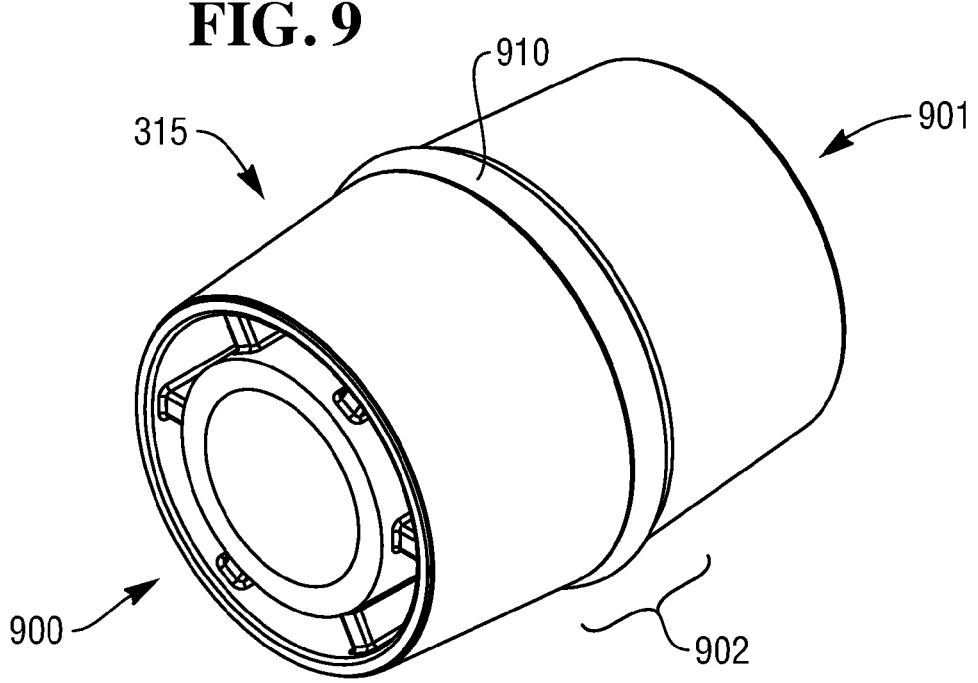
FIG. 9 illustrates a drum member with a groove extending circumferentially there around.

FIG. 9 helps illustrate the drive drum 315 in more detail. It will be appreciated that all of the drums or one or more or a plurality of the drums in the dispensing module may have a similar cross-section as the drum 315 shown in FIG. 9. The drum 315 is a rigid elongate structure having a longitudinal axis and being generally circular in cross-section, much like a cylinder. A first end 900 and a further end 901 have a similar diameter. This diameter increases as one moves from the ends of the drum towards a central region 902. In cross-section, the drum thus has a crowned roller appearance. It will be appreciated that a shaft (not shown) can be thrust along the length of the drum and thus the drum rotated by rotating the shaft. A groove 910 extends circumferentially around the whole of the circumference of the drum at a central region. The groove 910 shown in FIG. 9 has a U-shaped profile. However, it will be understood that grooves having different shaped profiles such as V-shapes or rectangular shapes could be utilised.

Figure 10:
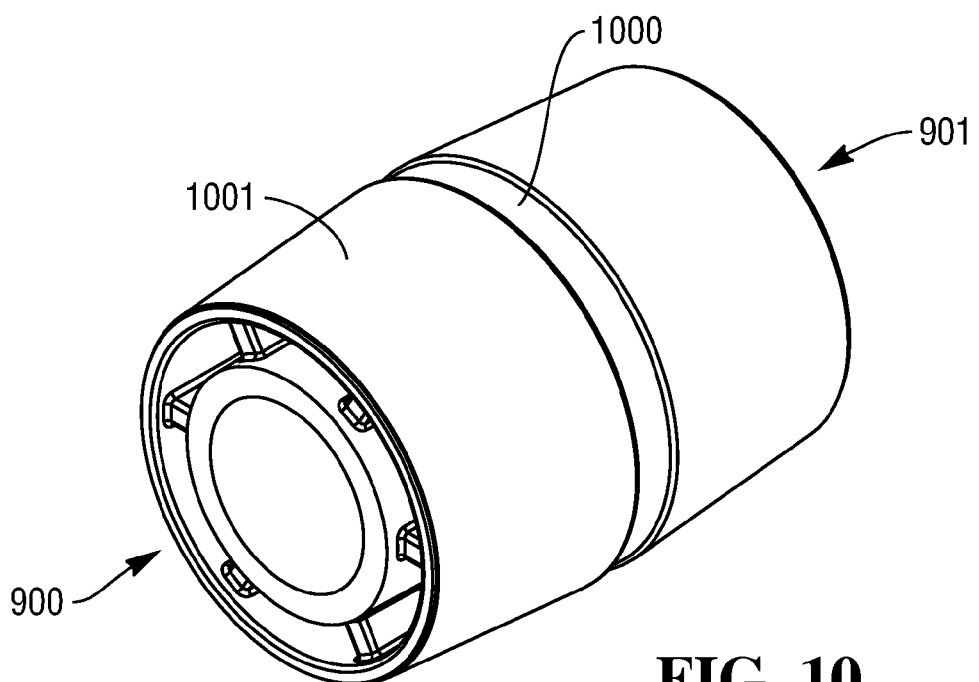
FIG. 10 illustrates the drum member shown in FIG. 9 with a high friction ring in the groove.

FIG. 10 illustrates the drum shown in FIG. 9 in which an "O" ring 1000 has been duly located in the groove 910. Rings having different shaped cross-sections could of course be utilised to match a groove shape. Because of the elastomeric nature of the "O" ring this can be stretched over an end of the drum and then run up across the abutment surface and located in the groove. Whilst the drum thus has an outer surface 1001 which is substantially hard and smooth and thus does not present a high friction surface to a belt riding thereon, the "O" ring is manufactured from a material having a high co-efficient of friction. The outer surface of the drum could of course be roughened or coated to make it provide a high friction surface. Alternatively, the drum may be manufactured from a high friction material. The drum member is thus rotatable about a longitudinal axis of rotation and includes an outer support surface that generally increases in diameter from a first end region to a central region and then decreases in diameter from the central region to a further end region. The central region includes a groove in the support surface which extends circumferentially around the drum member. A ring member is located in the groove. Aptly, the ring member is manufactured from a material that has a co-efficient of friction of at least about around 0.70. Aptly, the co-efficient of friction of the ring member is at least about around 0.90. Aptly, the co-efficient of friction of the ring member is at least about around 1.00. Aptly, the ring member is a rubber "O" ring. Because the ring member is arranged in the groove but extends beyond the outer surface of the drum, a flat belt running along the central crowned region of the drum does not slip and is impelled by the high friction ring. Flat belts can thus be used in the dispensing module without the need for expensive V belts or toothed belts to be utilised as is known in the art.

Figure 11:
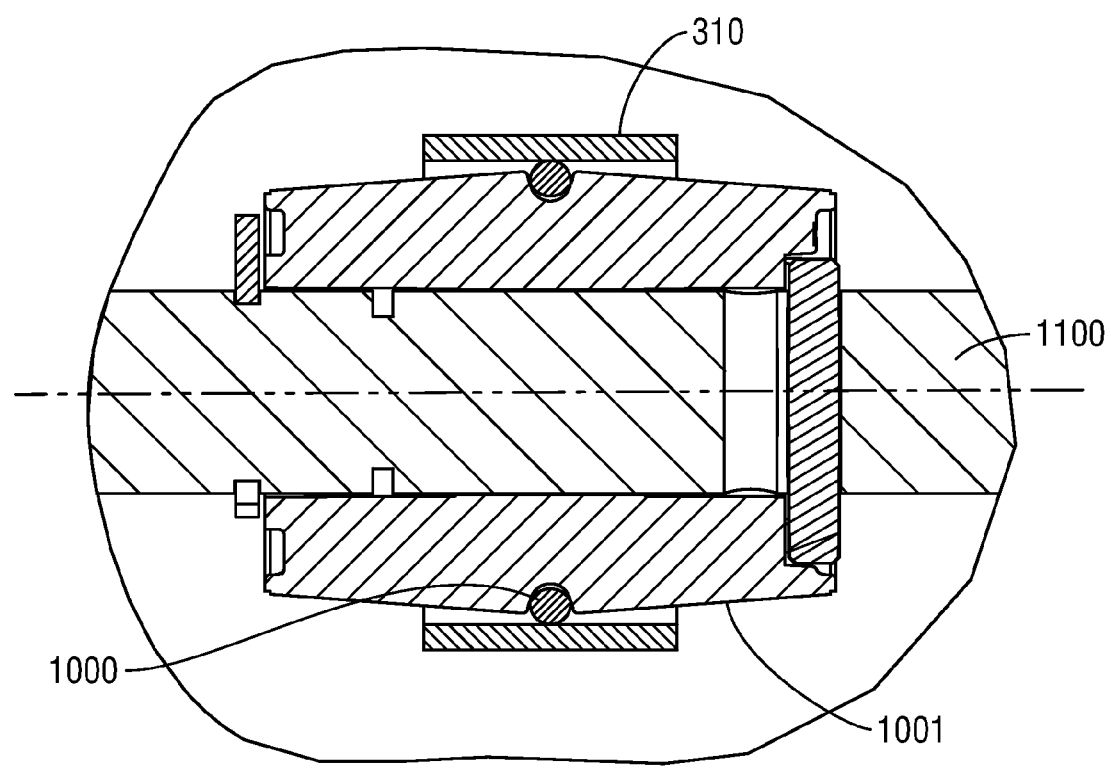
FIG. 11 illustrates how a flat belt rides on a high profile central region of the drum member.

FIG. 11 helps illustrate how the flat belt 310 rides along on a central region of the drum shown in FIG. 10 when the drum is mounted on a shaft 1100. For example, the drum may be the drum 315 shown in FIG. 3 or the drum 312 shown in FIG. 3. The shaft 1100 may be the drive shaft 313 shown in FIG. 3 or may be the shafts 316 which extend from the drum 315 and are supported in slots in a drum support on either side thereof.

A method of preventing slippage between a rotatable drum member and a flat belt member are thus provided. This is achieved by providing a groove in an outer surface of a rotatable drum member and providing a ring in the groove whereby as the drum rotates the ring provides a non-slip surface between a flat belt that at least partially rides on the outer surface of the drum and the ring member and between the ring member and the drum member.

Because the cross-sectional profile of each drum is convex, a method of centring a flat belt member on a rotating drum is also provided. This is because the crowned surface will cause a belt 310 to constantly centre around the central region of the drum. Thus, even if an operator attending the dispensing machine accidentally knocks a belt and causes the belt to be widely off centred on a drum when the machinery is turned on the flat belt will quickly ride upwards from an end of a drum towards the central region and thereafter function accordingly. Providing a ring member which extends proud of the outer surface of the rotatable drum helps maximise the centring process and also helps provide a non-slip surface. Thus, centring and provision of a non-slip interface can be provided simultaneously and automatically.

Certain embodiments of the present invention thus include the fitment of shaped rollers fitted offset to a centre line in order to encourage a media into a V-shaped or U-shaped profile as the leading edge of the item of media passes through a shaping zone. This action stiffens the media along its profile allowing the item of media to be repeatedly transported within the transport. This action of lifting the media with shaped rollers in turn pushes the media guides upwards. The guides are constrained by a stop which is positioned to ensure that the guides are aligned to a position where the media must run along the base of the guides which then act as a media brake. As the rear of the note passes beyond the shaped rollers the guides gently move downwards assisting the media to move into a stack position which is in a nearby tray.

There are no additional motors, solenoids or censors required to put certain embodiments of the present invention into effect. The system is mechanical and as such is a low cost method of providing a system of transporting and stacking items of media with a wide range of stiffness characteristics.

Consistent transportation of items of media having a wide range of media qualities is thus provided.

A crown roller may be utilised with an internally grooved profile into which a high friction band, for example, a low cost "O" ring, is applied. This high friction band reduces the slippage between the crown roller and a flat belt. Additionally, a high profile point is provided in the roller to assist in the centring of the belt on a crown drum such as a crown pulley. An advantage is the ability of the belt to self-centre even if displaced during an action such as an operator jam clearance. This helps improve consistency of media transportation and reduces reject rate due to more consistent transport performance. The drum can be driven to provide drive to a belt or a belt can be driven to provide drive to a shaft on which a drum is mounted.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. Apparatus for supporting a flat belt member, the apparatus comprising:
   a drum member rotatable about a longitudinal axis of rotation and including an outer support surface that generally increases in diameter from a first end region to a central region and decreases in diameter from the central region to a second end region, wherein the central region has a groove in the outer support surface extending circumferentially around the drum member;
   a ring member located in the groove to (i) support a flat belt member, (ii) prevent slippage between the flat belt member and the drum member, and (iii) imbue an arcuate cross-section into a sheet-like item of media and thereby to increase rigidity of the sheet-like item of media when the sheet-like item of media is sandwiched between belts; and
   first and second guide arms to move in common with one another, each guide arm to engage side regions of the item of media as the item of media is thrust out between the belts and each guide arm lifts in response to a leading edge of the item of media exiting between the belts having the increased rigidity, and each guide arm lowers in response to a trailing edge of the item of media ejected from the belts and in response to a decrease in rigidity of the item of media, and when the guide arms are lowered, the item of media is presented at an exit orifice of the apparatus.

2. The apparatus as claimed in claim 1, wherein the ring member is manufactured from a material that has a co-efficient of friction of at least about around 0.70.

3. The apparatus as claimed in claim 2, wherein the coefficient of friction is at least about around 0.90.

4. The apparatus as claimed in claim 3, wherein the coefficient of friction is at least about around 1.00.

5. The apparatus as claimed in claim 1, wherein the ring member comprises a rubber "O" ring.

6. The apparatus as claimed in claim 1, wherein the drum member comprises a crown roller.

7. The apparatus as claimed in claim 1, wherein the ring member is arranged to substantially prevent slippage between the drum member and an inner abutting surface of a flat belt member.

8. The apparatus as claimed in claim 1, wherein the groove has a substantially U-shaped cross-section or a substantially V-shaped cross-section or a substantially semi-circular cross-section.

9. The apparatus as claimed in claim 1, wherein the ring member has a substantially circular cross-section or a substantially rectangular cross-section.

10. An automated teller machine (ATM) or self-service terminal comprising:
a media item transport mechanism for conveying sheet-like items of media from a first end of a media item transport path to a second end of the media item transport path, the media item transport mechanism including (i) a drum member rotatable about a longitudinal axis of rotation and including an outer support surface that generally increases in diameter from a first end region to a central region and decreases in diameter from the central region to a second end region to form a generally crowned central region of the rotatable drum member, wherein the crowned central region has a groove in the outer support surface of the drum member, (ii) a ring member extending around the crowned central region of the rotatable drum member in the groove, (iii) a flat endless belt member which rides on the ring member at the crowned central region of the outer support surface to imbue an arcuate cross-section into a sheet-like item of media and thereby to increase rigidity of the sheet-like item of media as the drum member rotates about its longitudinal axis of rotation to convey the sheet-like item of media from the first end of the media item transport path to the second end of the media item transport path, wherein the sheet-like item of media is sandwiched between belts, and (iv) first and second guide arms to move in common with one another, each guide arm to engage side regions of the item of media as the item of media is thrust out between the belts and each guide arm lifts in response to a leading edge of the item of media exiting between the belts having the increased rigidity, and each guide arm lowers in response to a trailing edge of the item of media ejected from the belts and in response to a decrease in rigidity of the item of media, and when the guide arms are lowered, the item of media is presented at an exit orifice of the ATM or self-service terminal.

11. An apparatus, comprising:
a rotatable crowned drum member having a groove in an outer support surface of the rotatable crowned drum member;
a ring member situated in the groove of the crowned drum member and configured to: (i) prevent slippage between the flat belt member and the crowned drum member, and (ii) imbue an arcuate cross-section into a sheet-like item of media and thereby to increase rigidity of the sheet-like item of media when the sheet-like item of media is sandwiched between belts; and
first and second guide arms to move in common with one another, each guide arm to engage side regions of the item of media as the item of media is thrust out between the belts and each guide arm lifts in response to a leading edge of the item of media exiting between the belts having the increased rigidity, and each guide arm lowers in response to a trailing edge of the item of media ejected from the belts and in response to a decrease in rigidity of the item of media, and when the guide arms are lowered, the item of media is presented at an exit orifice of the apparatus.

12. A method of operating a media item transport mechanism in an automated teller machine (ATM) or self-service terminal, the method comprising the steps of:
providing a groove in a central region of an outer support surface of a rotatable crowned drum member of the media item transport mechanism;
providing a ring member extending around the outer support surface of the crowned drum member in the groove;
locating a flat belt member on the ring member at the central region of the crowned drum member as the belt member rides on the ring member to imbue an arcuate cross-section into a sheet-like item of media and thereby to increase rigidity of the sheet-like item of media when the sheet-like item of media is sandwiched between belts;
lifting two guide arms in response to a leading e of the item of media having the increased rigidity as the item of media exits the belts and engaging, by the guide arms, side regions of the item of media as the item of media is thrust out between the belts;
lowering the two guide arms in response to a trailing edge of the item of media ejected from the belts and in response to a decrease in rigidity of the item of media; and
presenting, at an exit orifice of the ATM or self-service terminal, the item of media once the guide arms are lowered.

13. A media item transport mechanism for an automated teller machine (ATM) or self-service terminal, the media item transport mechanism comprising:
an endless flat belt member having an inner abutting surface;
a drum member rotatable about a longitudinal axis of rotation and including an outer support surface that generally increases in diameter from a first end region to a central region and decreases in diameter from the central region to a second end region, wherein the central region has a groove in the outer support surface extending circumferentially around the drum member;
a ring member located in the groove and extending around the outer support surface which extends circumferentially around the drum member to (i) provide a non-slip surface between the ring member and the inner abutting surface of the endless flat belt member, and (ii) imbue an arcuate cross-section into a sheet-like item of media and thereby to increase rigidity of the sheet-like item of media as the sheet-like item of media is being sandwiched between belts and transported through the media item transport mechanism; and first and second guide arms to move in common with one another, each guide arm to engage side regions of the item of media as the item of media is thrust out between the belts and each guide arm lifts in response to a leading edge of the item of media exiting between the belts having the increased rigidity, and each guide arm lowers in response to a trailing edge of the item of media ejected from the belts and in response to a decrease in rigidity of the item of media, and when the guide arms are lowered, the item of media is presented at an exit orifice of the apparatus.

14. The media item transport mechanism as claimed in claim 13, wherein the ring member comprises a rubber "O" ring.

15. The media item transport mechanism as claimed in claim 13, wherein the drum member comprises a crown roller.

16. The media item transport mechanism as claimed in claim 13, wherein the groove has a substantially U-shaped cross-section or a substantially V-shaped cross-section or a substantially semi-circular cross-section.

17. The media item transport mechanism as claimed in claim 13, wherein the ring member has a substantially circular cross-section or a substantially rectangular cross-section.

\* \* \* \* \*